INVENTOR.
EDWIN D. SISSON
RICHARD CHAPMAN
BY
Anthony D. Cennamo

Dec. 8, 1970   E. D. SISSON ET AL   3,546,578
HETERODYNED FREQUENCY NONDESTRUCTIVE TESTING SYSTEM UTILIZING
A HALL EFFECT DEVICE FOR MAGNETIC FIELD SENSING
OF AN EDDY CURRENT REACTION MAGNETIC FIELD
Filed July 21, 1967   3 Sheets-Sheet 2

MAGNETIC
VECTOR LOCUS
CURVE

INVENTOR.
EDWIN D. SISSON
RICHARD CHAPMAN
BY
ATTORNEY

INVENTOR
EDWIN D. SISSON
RICHARD CHAPMAN
BY

ATTORNEY

United States Patent Office 3,546,578
Patented Dec. 8, 1970

3,546,578
HETERODYNED FREQUENCY NONDESTRUCTIVE TESTING SYSTEM UTILIZING A HALL EFFECT DEVICE FOR MAGNETIC FIELD SENSING OF AN EDDY CURRENT REACTION MAGNETIC FIELD
Edwin D. Sisson, Worthington, and Richard M. Chapman, Columbus, Ohio, assignors to F. W. Bell, Inc., Columbus, Ohio
Filed July 21, 1967, Ser. No. 655,123
Int. Cl. G01r 33/06
U.S. Cl. 324—45                                                6 Claims

ABSTRACT OF THE DISCLOSURE

The present invention relates to a system for the measurement of the magnetic permeability and electrical conductivity properties of metallic materials. Specifically, the system utilizes a Hall effect device in the analysis of the magnetic field and eddy current induction within the test material. A variable frequency oscillator signal driving the Hall effect device is heterodyned with a variable frequency oscillator signal providing the magnetizing current for the magnetic coil probe. The system further encompasses presenting the output voltage of the Hall effect device in X-Y coordinates of the net field ($H_n$) and the reaction field ($H_r$).

BACKGROUND

In nondestructive testing the eddy current method is used to examine electrically conductive objects. In principle, when a conductor is placed in an alternating magnetic field, eddy currents are set up in the conductor by electromagnetic induction, and the magnitude, phase and distribution of these currents are substantially determined by electrical conductivity and physical characteristics of the conductor, e.g., its size, shape, purity or hardness, or by the presence of porosity or flaws. These currents and their variations, in turn, produce a reaction magnetic field which may then be detected and measured from changes in the magnetic field which are detectable outside the conductor.

The Hall effect is the resultant of a voltage across opposite edges of an electrical conductor carrying current and placed in a magnetic field. The Lorentz force is the basis of this effect which depends upon the deflection of charged particles moving in a magnetic field. This force is in a direction mutually perpendicular to the path of the particle's movement and the magnetic field direction. A voltage output results across the conductor whose magnitude depends upon the product of the control current and the magnetic field. If either input is zero the output will be zero. If the control current is held constant the output voltage is proportional to the magnetic field and, conversely, if the magnetic field is held constant the output voltage is proportional to the control current. Therefore the Hall effect has an inherent multiplying property.

In the conventional prior art eddy current measuring system, a second coil, i.e., a pick-up coil, may be utilized to measure the changes in the eddy current field or impedance changes in the exciting coil. There is disclosed in the copending application, S.N. 389,409, filed Aug. 13, 1964, for Magnetic Reaction Testing Apparatus and Method of Testing Utilizing Semiconductor Means for Magnetic Field Sensing of an Eddy Current Reaction Magnetic Field, by Robert C. McMaster and Edwin D. Sisson, now U.S. Pat. No. 3,359,495, a metallic material eddy current analyzer that considerably improves upon the conventional prior art measuring systems. Basically, the system of the copending application utilizes a Hall effect device in lieu of the conventional pick-up coil. In a typical arrangement a variable frequency, highly-stabilized, constant-current oscillator provides the magnetizing current for the magnetizing coil in the probe. A Hall effect element excited with a current is located within the field of the magnetizing coil. The Hall effect device senses—and provides an A.C. voltage proportional to—the magnetizing field of the coil and the magnetic reaction field resulting from the flow of eddy currents of the material under test. Finally, circuit means are described for the ultimate display of the magnitudes of the magnetizing field ($H_o$), the test material reaction field ($H_r$), and the net or total field ($H_n$).

The measuring systems constructed in accordance with the teachings of the copending application have proved themselves for the intended purposes. The results are beyond those expected and the instruments have been quite successful commercially. However, these systems do have limitations. For instance, the frequency of the variable frequency oscillator driving the magnetizing coil has a practical use limitation of up to approximately 100 kc. Beyond this frequency undesired induced signals into the Hall circuit, etc., cause the measurements to be distorted with increasing error. Secondly, as pointed out above, the test material reaction field ($H_r$), and the net or total field ($H_n$) are displayed. However, the locus of these two field vectors must be plotted—and to be done expeditiously, special graph paper is required.

The present invention, an improvement on the system of the copending application, is capable of extending the frequency of the magnetizing current by eliminating the error signals from the Hall effect device. Also, the system of the present invention is capable of graphically illustrating the reaction field ($H_r$) and the net field ($H_n$) as X-Y coordinates.

BRIEF DESCRIPTION OF THE INVENTION

In the system of the copending application, a variable frequency oscillator signal $f_1$ drives the magnetizing coil in the probe. The Hall effect device is driven by a constant D.C. current supply. The Hall device output voltage, representing the reaction field ($H_r$) and the net field ($H_n$), is amplified and rectified. In a first preferred embodiment of the present invention, the Hall device is driven by a second variable-frequency oscillator signal $f_2$ in lieu of the constant current D.C. source. The Hall device output voltage—still representing the net field ($I_n$)—will consist of two signals having frequencies that are both the sum and the difference of the two oscillator signals $f_1$ and $f_2$. In a refined embodiment a second oscillator signal $f_2$ is heterodyned with the first oscillator signal $f_1$ and then applied to the Hall effect device. In this way the output voltage of the Hall effect device will be at the frequency of $f_2$ and proportional to $H_y$, the component of $H_n$ in phase with $H_o$. Finally an alternative embodiment a third oscillator signal $f_3$ is heterodyned with a 90° phase shifted oscillator signal . . . $f_1$ and summed with the beat of $f_1$ and $f_2$ and fed to the Hall effect device. The output of the Hall effect device is amplified by a first amplifier tuned to the frequency $f_2$ and a second amplifier tuned to the frequency $f_3$. The output voltages from the amplifiers are the $H_y$ and $H_x$ components of the net field ($H_n$).

OBJECTS

It is a principal object of the present invention to provide a magnetic field measuring system as applied to eddy current non-destructive testing.

It is a further object of the present invention to provide a new and improved eddy current/Hall effect measuring system.

It is a further object of the present invention to provide an eddy current/Hall effect measuring system that does not contain the practical limitations of frequency range of the magnetizing current.

It is another object of the present invention to provide an eddy current/Hall effect measuring system capable of displaying or measuring the X component and/or the Y component of the net field ($H_n$).

Other objects and features of the present invention will become apparent from the detailed description when taken in conjunction with the following drawings.

DETAILED DESCRIPTION OF THE DRAWINGS

Figure 1:
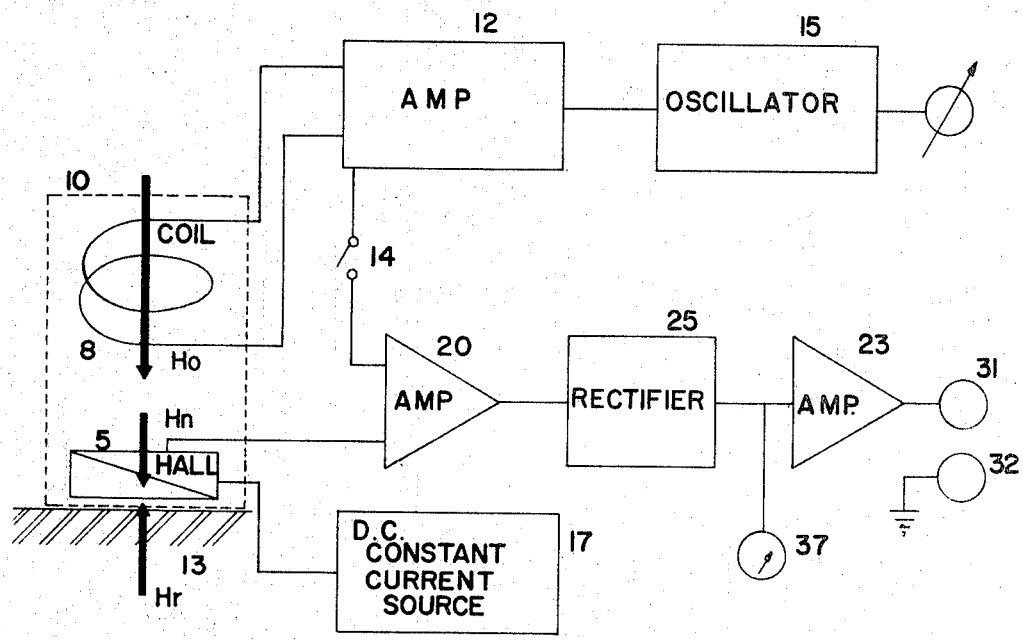
FIG. 1 is a block schematic illustration of the eddy current/Hall effect measuring system described in the aforementioned application.

The block-schematic illustration of FIG. 1 is the magnetic reaction analyzer described in the aforementioned copending application. A brief description thereof will lend to an understanding of the improvements of the present invention.

The probe 10 comprises a magnetizing coil 8 and a Hall effect detector 5. In an actual constructed embodiment the Hall effect detector 5 is located within the coil 8. Other arrangements of the coil 8 and the detector 5 have been demonstrated—the criteria is that the detector 5 must be in the magnetizing field of the coil 8.

A variable frequency oscillator 15 provides the magnetizing current to the coil 8. The oscillator 15, in practice, is highly stabilized and has a constant voltage output. The output signal of the variable frequency oscillator 15 is amplified by a constant-current amplifier 12 interposed between the output of the variable frequency oscillator 15 and the coil 8. Since the output current of the amplifier is held constant by feedback, the amplitude of the field is therefore maintained constant regardless of frequency. In the embodiment illustrated, the frequency range of the variable frequency oscillator 15 is approximately between 20 c./s. (Hz.) to 100 kc./s. (kHz.).

As pointed out above relative to the normal operation of a Hall effect device, a current is applied through the device to one of its axes. In the embodiment of FIG. 1 this current is supplied by the D.C. constant current supply 17. The output of the Hall effect detector 5—the intelligence voltage—is amplified by amplifier 20. Since the output voltage of the Hall detector 5 will have a frequency of that of the particular setting of the variable frequency oscillator 15, the amplifier 20 must be sufficiently broadband to amplify signals within the frequency range of the oscillator 15.

The amplified voltage output of the amplifier 20 is converted to D.C. by demodulator rectifier 25 and then again amplified by D.C. amplifier 23. The output of the amplifier 23 appearing across terminals 31 and 32 represents the desired intelligible voltage. The meter 37 provides a direct information display.

In operation of the circuit of FIG. 1 when the test probe is held remote from a test object, the Hall detector 5 measures only that field established by the excitation coil $H_0$. Though the frequency of the excitation field $H_0$ may be varied, the amplitude of this field remains constant. That is, (1) the excitation coil produces a field proportional to current and is supplied by a constant-current amplifier and (2) the Hall element sensitivity is not influenced by changing frequency. Consequently, $H_o$ is indicated with a constant value at all test frequencies. Again, in operation, the meter deflection (proportional to the constant field $H_0$) has been established as a full-scale reading. When the test probe is placed on or near a conductive test object, i.e., workpiece 13, eddy currents are induced in the object. The magnetic reaction vector, $H_r$, produced by these eddy currents, vectorially adds to the excitation field, $H_0$, producing the net field component, $H_n$, at the Hall detector 5. The third magnetic reaction vector, $H_r$, is obtained by subtracting $H_o$ from the net field, $H_n$, in the analyzer. This is achieved by closing the switch 14 and introducing a subtraction signal into the amplifier equal in magnitude to that produced by $H_o$. In this condition, no output is indicated when the probe 10 is remote from the test material, i.e., $H_o-H_o$=zero but when the probe 10 is positioned on a conductive material, the magnetic reaction vector $H_r$ is alone indicated.

Figure 1A:
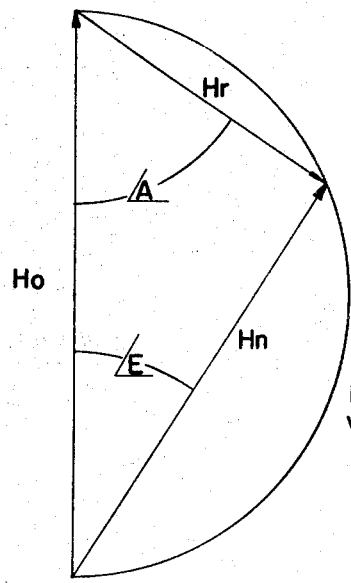
FIG. 1a is a graphical illustration of the vector locus curves of the embodiment of FIG. 1.

The relationships of these vectors (or phasors) are diagrammed in FIG. 1a. Vector locus curves $H_n$ and $H_r$ varying with properties of the test material, are plotted using a circular coordinate graph paper that has coordinate systems radiating from the origins of $H_n$ and $H_r$.

As the test frequency, electrical conductivity, or thickness of test specimen is increased, eddy current density within the test material is also increased. This is reflected in an increase in the $H_r$ vector, so that the circle locus is traversed in a clockwise manner for any of these increases. When inspection is performed at a fixed test frequency, any material discontinuities that alter the conductivity or thickness (geometry) of the part under test will then create a departure from the normal, predictable vector plot.

As pointed out above, the magnetic reaction analyzer of the aforementioned copending application has an upper frequency limit of the order of 100 kc. This is a practical limitation in that the lead connections and magnetic loops pick up the exciting and reaction fields tending to mask the desired Hall output signal. The output reading, therefore, lacks discernibility beyond this upper limit. Further, as also mentioned above, the amplifiers must be broadband. That is, they must have a flat output response throughout the frequency variation range. The system of the present invention eliminates the frequency limitation of the aforementioned system by providing a fixed frequency output. Also, the amplifiers are tuned to this set frequency and therefore need not be broadband. The output frequency could be in the lower range and, together with the tuned amplifiers, the induced field signals are not indicated.

Figure 2:
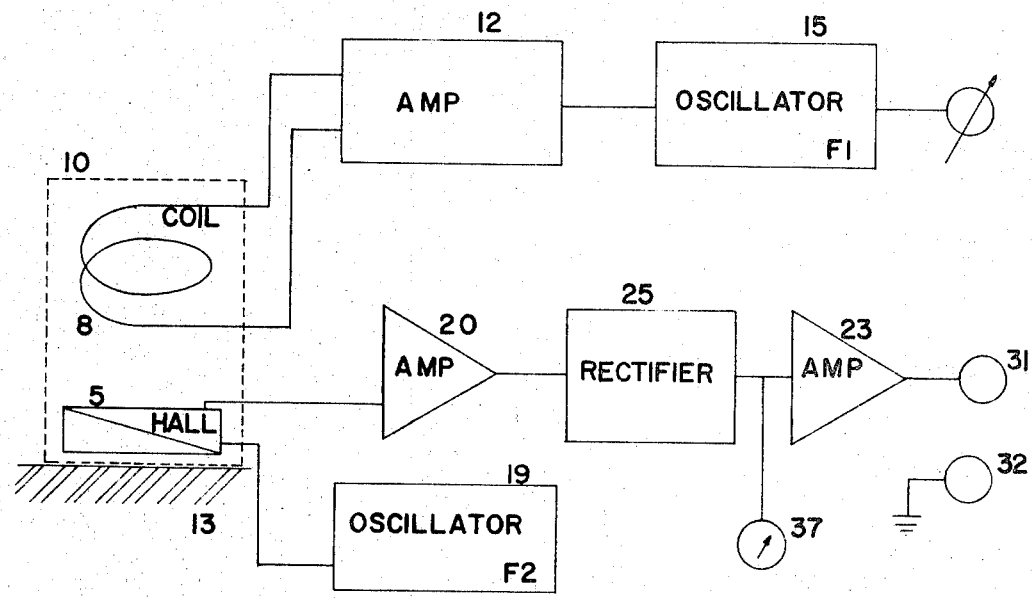
FIG. 2 is a first embodiment of the invention in block-schematic.

Referring now to FIG. 2 there is shown a first embodiment for achieving these improvements. The probe 10 and its magnetizing coil 8 is driven in a similar manner as that shown in FIG. 1. That is, the signal from the variable frequency oscillator 15 is amplified in the constant current amplifier 12 and utilized as the magnetizing current for the coil 8. The probe 10 again has the Hall effect device 5 as an eddy current field detector. In a first departure from the system of FIG. 1 the Hall effect device 5 is not driven by a D.C. current, but is fed with an alternating current at a frequency $f_2$ from oscillator 19. The output of the Hall effect device 5 will be at the difference frequency $(f_1-f_2)$ and the sum frequency $(f_1+f_2)$. The beating effect is due to the inherent multiplying property of the Hall effect detector 5. The amplifier 20, amplifying the varying amplitude output signal of the Hall effect device 5, in this instance, may be tuned at the difference frequency of $(f_1-f_2)$. The rectifier 25, amplifier 23, and meter readout 37 will then reflect the varying voltage output of the Hall detector 5 at the difference frequency, i.e., $(f_1-f_2)$.

Since the amplifier 20 is tuned, induced field signals will be eliminated. That is, in the improved embodiment, the induced signals from the coil 8 will be at frequency $f_1$ and therefore rejected by the amplifier tuned to $(f_1-f_2)$; also, stray signals from the Hall current source 19 will be at $f_2$ and rejected. In this instance the output signal is a difference signal that is much lower in frequency than either $f_1$ or $f_2$. Accordingly, the upper frequency limitation of the variable frequency oscillator 15 is eliminated since the stray pickup effects, mentioned above, do not exist at the difference frequency $(f_1-f_2)$.

In those applications of the magnetic reaction analyzer, wherein specific tests are made at various operating frequencies of $f_1$, it would be necessary in this embodiment to retune the frequency of the A.C. Hall effect oscillator 19, $f_2$, for each frequency variation of the oscillator 15 driving the magnetizing coil 8. This would be necessary to maintain the amplifier 20 at a fixed frequency, that is, to maintain $(f_1-f_2)$ a constant.

Figure 3:
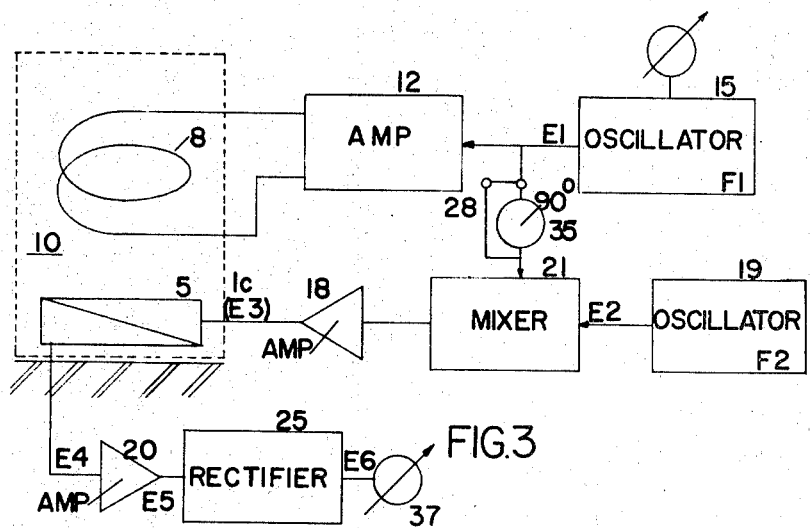
FIG. 3 is a second embodiment of the invention in block-schematic for illustrating one of the measured fields directly as a coordinate.

In a fixed alternative embodiment the need for returning the oscillator 19 is eliminated. With reference to FIG. 3 there is shown in block-schematic diagram this preferred embodiment. The probe 10 and its magnetizing coil 8 is again driven in a similar manner as that shown in FIG. 1 and FIG. 2; that is, the signal from the variable frequency oscillator 15 is amplified in the amplifier 12 and utilized as the magnetizing current for the coil 8. Also as in FIG. 2, the Hall effect device 5 is not driven by D.C. current but is fed with an alternating current from oscillator 19. The specific improvement encompasses the second oscillator 19 of FIG. 2 but in this embodiment its output is not fed directly to the Hall effect device 5, but (referring to FIG. 3) is heterodyned in mixer 21 with the output of the magnetizing coil oscillator 15. The beat frequencies, i.e., the sum $(f_1+f_2)$ and the difference $(f_1-f_2)$, generated in the output of the mixer 21 are fed to the amplifier 18 and then applied to the Hall effect device 5. The output voltage of the Hall effect device 5 is amplified in amplifier 20 before demodulation by demodulator 25. In this embodiment the amplifier 20 is sharply tuned at the frequency of the oscillator 19, that is, at $f_2$. Therefore, in those instances where a series of measurements are made by varying the frequency of the oscillator 15, the output voltage of the amplifier 20 will be at a frequency that is the same as that of oscillator 19, as shown below.

In a first case, switch 28 is closed so that phase shifter 35 is not included in the circuit. In analysis of the Hall effect device and circuit of FIG. 3 the current from the linear product mixer 21 is:

$$I_c = E_1 E_2 K_1 \sin 2\pi f_1 t \sin 2\pi f_2 t \qquad (1)$$

where $E_1$ is the output of oscillator 15 and $E_2$ is the output of oscillator 19. $K_1$ is a proportionality constant.

The Hall voltage output is therefore:

$$E_4 = K_2 I_c B \text{ (the basic Hall equation)} \qquad (2)$$

$$E_4 = (K_1 K_2 E_1 E_2 \sin 2\pi f_1 t \sin 2\pi f_2 t) B \qquad (3)$$

B is the field at the Hall element and in this case is $H_n$.

$$B = H_n \sin (2\pi f_1 t + \theta) \qquad (4)$$

where $\theta$ is the phase shift between $H_n$ and $H_0$ caused by the eddy current reaction field in the test piece.

$$E_4 = H_n K_1 K_2 E_1 E_2 \sin 2\pi f_1 t \sin 2\pi f_2 t \sin (2\pi f_1 t + \theta) \qquad (5)$$

Let:

$$K_1 K_2 E_1 E_2 = K_3 \qquad (6)$$

Then:

$$E_4 = K_3 H_n \sin 2\pi f_1 t \sin 2\pi f_2 t \sin (2\pi f_1 t + \theta) \qquad (7)$$

This reduces to:

$$E_4 = \frac{H_n K_3}{2} (\sin 2\pi f_2 t \cos \theta - \frac{H_n K_3}{4} [\sin (4\pi f_1 t + 2\pi f_2 t + \theta) + \sin (4\pi f_1 t - 2\pi f_2 t + \theta)] \qquad (8)$$

The Hall element output $E_4$ is amplified by the narrow band amplifier 20 which is tuned to frequency $f_2$. Assuming the frequency terms other than $f_2$ are outside the frequency limits of the amplifier (which is the desirable operating mode) the terms containing $f_1$ are eliminated and the amplified Hall output voltage $E_5$ will be:

$$E_5 = H_n \frac{K_3 K_4}{2} (\sin 2\pi f_2 t \cos \theta) \qquad (9)$$

Let $$\frac{K_3 K_4}{2} = K \qquad (10)$$

Then $$E_5 = H_n K (\sin 2\pi f_2 t)(\cos \theta) \qquad (11)$$

after demodulation by demodulator or rectifier 25

$$E_6 = K|H_n| \cos \beta \qquad (12)$$

The initial assumption has been that the B field at the Hall element is the total or net field $(\overline{H_o} + \overline{H_r})$, which is the vector sum of the magnetizing field $H_o$ and the eddy current reaction field $H_r$, giving the net field $H_n$. Therefore $E_6$ is proportional to the net field, with the effects of the eddy current phase shift described below.

Normally the H plane (FIG. 4) would appear as follows:

$$|H_y| = |H_n| \cos \theta \qquad (13)$$

Therefore:

$$|E_6| \approx |H_y| \qquad (14)$$

Again referring to FIG. 3, if the 90° phase shifter 35 is inserted between the oscillator 15 and the mixer 21 by opening switch 28 the Hall voltage becomes:

$$E_4 = H_n K_3 \sin 2\pi f_2 t \cos 2\pi f_1 t \sin (2\pi f_1 t + \theta) \qquad (15)$$

This reduces after narrow band amplification to:

$$E_5 = H_n K (\sin 2\pi f_2 t)(\sin \theta) \qquad (16)$$

after demodulation becomes $$E_6 = |H_n| K (\sin \theta) \qquad (17)$$

Figure 4:
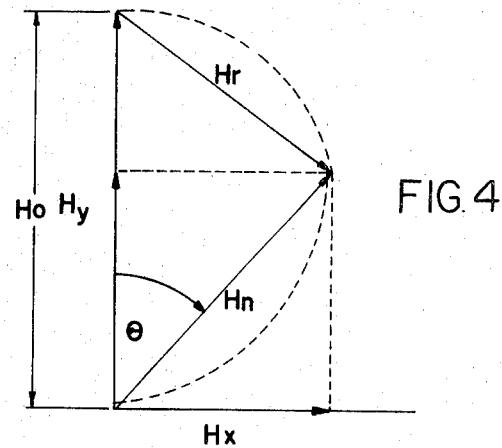
FIG. 4 is a graphical illustration of the H plane diagram of the embodiment of FIG. 3.

Again referring to the H plane diagram of FIG. 4:

$$|H_x| = |H_n| \sin \theta \qquad (18)$$

Therefore $$|E_6| \approx |H_x| \qquad (19)$$

It is resolved, therefore, that the output voltage of the demodulator 25 will be that of Equation 12. Or, alternatively, if a 90° phase shift 35, by way of switch 28, is interposed between the output of the oscillator 15 and the mixer 21, the output voltage of the demodulator 25 will be that of Equation 17. Further, since the angle of phase shift $\theta$ of the net field at the Hall device output voltage $E_5$ is the same as that of $H_n$ and the magnitude at $E_5$ is proportional to $H_n$, the voltage $E_5$ corresponds to the Y coordinate of $H_n$ which is $H_y$. With the 90° phase shift interposed, as mentioned above, the net field $H_n$ is plotted in a second coordinate $H_x$. It is seen, therefore, if a switch 28 were to alternately put in and take out the 90° phase shift the locus of the net field $H_n$ could be plotted directly on X-Y coordinates.

Figure 5:
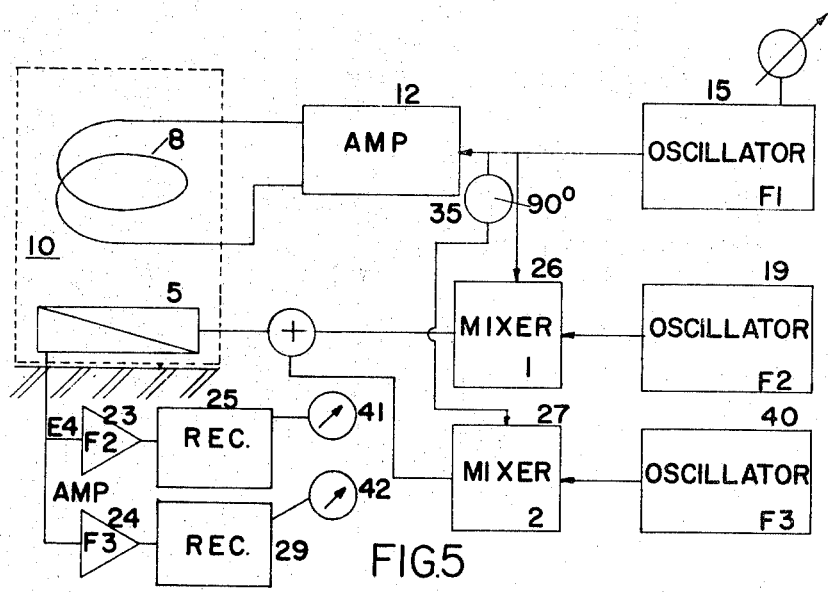
FIG. 5 is another embodiment of the invention in block-schematic measuring both the X–Y coordinates simultaneously.

In the ultimate and preferred embodiment of FIG. 5 the net field $H_n$ is read out directly in X-Y coordinates, i.e., $H_y$ and $H_x$. The circuit of FIG. 5 eliminates the switching arrangement necessary in FIG. 3. The two readings $H_y$ and $H_x$ are simultaneously present in the two coordinates.

With specific reference to FIG. 5 the probe 10 and its magnetizing coil 8 are again driven by the variable frequency oscillator 15. The Hall effect device 5 receives its current excitation from the oscillators 19 and 40. Also as in the previous figure, the outputs of the two oscillators 15 and 19 are heterodyned in mixer 26 prior to being fed to the Hall effect device 5. A first output $E_4$ of the Hall effect device 5 is fed into the sharply tuned amplifier 23. This amplifier is tuned to the frequency of the second oscillator 19 ($f_2$) to provide the $H_y$ output as explained with reference to FIG. 3 and can be plotted directly in the Y axis. A third oscillator 40 at a frequency of $f_3$ is also mixed with the output of the oscillator 15. However, in this instance the output of the oscillator 15 is shifted 90° in phase by shifter network 13 prior to being mixed in mixer 27. A second output from the Hall device 5 is therefore obtainable by way of a second amplifier 24 sharply tuned to the frequency $f_3$ of the oscillator 40, and fed to demodulator 29. This provides the $H_x$ output; this voltage $H_x$ is plotted directly in the X coordinate. It is seen, therefore, that the field $H_n$ is taken directly from the meter outputs 41 and 42 and plotted directly as X-Y coordinates—$H_y$ and $H_x$. Alternatively, the output of the demodulators 25 and 29 may be applied in the X and Y axes of the electrical recording meter for continuous measuring variations in the eddy current measurements. Or again, the outputs of the demodulators 25 and 29 may be applied directly to an oscilliscope X-Y coordinates for continuous visual presentation.

There is disclosed in the aforementioned copending application magnetic reaction analyzer an alternative embodiment utilizing a pair of Hall effect detectors. In operation the two detectors provide a differential magnetic reaction analyzer. Specifically, that system includes an excitation field for two Hall detectors that may be located in a single probe assembly for differential testing. Or, again, each Hall detector may be within individual probe assemblies for comparison testing. The outputs of the Hall detectors are connected differentially so that the indicated output of the analyzer represents the difference between the two detector output voltages, or difference of the net magnetic vectors at two discrete test locations.

Figure 6:
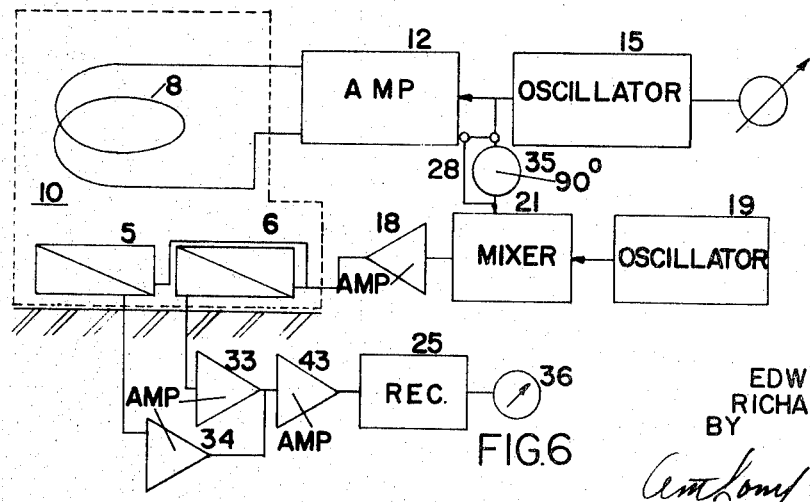
FIG. 6 is still another embodiment of the invention incorporating the differential analyzer probe.

The unique features of the differential analyzer are preserved in the system of the present invention. With reference to FIG. 6 there is shown in block schematic a differential analyzer together with the heterodyne principles above described. The embodiment of FIG. 6 is similar to that of FIG. 3 with the added Hall detector 6. In the differential analyzer of FIG. 6 the amplified output of amplifier 18, from the mixer 21 containing both the sum and difference of the two oscillator frequencies 15 and 19, is fed to each of the two Hall detectors 5 and 6. The Hall detectors are operative, as above described, and their individual outputs are amplified by amplifiers 33 and 34 respectively. The outputs of the two amplifiers are then combined and their differential output signal is further amplified in amplifier 43, demodulated by demodulator 25, and displayed on meter 36.

Simply, in operation, the differential system of the present invention retains the unique features of the differential output but yet is an improvement thereover by incorporating the fixed frequency principles of the present invention.

In a summary analysis the systems of the present invention provide measurements in rectangular coordinates more suitably for plotting or direct display. The system is without the frequency limitations of the prior devices resulting in increased bandwidth that permits measurements heretofore not possible. For instance, chromium plating on a steel base can now be measured. Since penetration of the field is related inversely to frequency, the frequency limitation of the prior art prevented these measurements. Another measurement now possible with the system of the present invention is where information desired is related to a property other than thickness. In the prior devices where the field penetrates the thickness of the material, variations in the thickness would affect the output reading of the properties being measured. In the preferred embodiment where the frequency is sufficiently high, penetration does not exceed the thickness of the material. One such measurement is conductivity. Again, in those systems utilizing a servo for control purposes having an input from a measurement, the input can be at the optimum frequency of the servo system. Other applications will be apparent to those skilled in the art.

Although certain embodiments have been illustrated, it is understood departures may be had within the scope of the invention. For instance, the differential analyzer of FIG. 6 may be utilized in the three frequency system of FIG. 5.

What is claimed is:

1. A measuring system as described comprising:
   a magnetic field sensing probe including a magnetizing coil and a Hall effect device in magnetic coupled relationship,
   a first oscillator having an output signal at a frequency ($f_1$) fed to said magnetizing coil thereby creating a magnetic field,
   a second oscillator having an output signal at a frequency ($f_2$),
   mixer means connected to said first and second oscillators for heterodyning said first ($f_1$) and second ($f_2$) oscillator output signals,
   means connected to said mixer means and to said Hall effect device for feeding said heterodyned signals to said Hall effect device,
   means tuned to said frequency ($f_2$) connected to the output of said Hall effect device to demodulate the output signal therefrom, and,
   means connected to said last-named means for indicating the amplitude of said demodulated signal.

2. A measuring system as set forth in claim 1 wherein said heterodyned signals are fed to said Hall effect device as a constant current source.

3. A measurnig system as set forth in claim 1 further comprising: phase shifting means interposed between said first oscillator output and said mixer means.

4. A measuring system as set forth in claim 3 further comprising: switch means for alternately connecting and disconnecting said phase shifting means.

5. A measuring system as set forth in claim 1 further comprising:
   a third oscillator having an output signal at a frequency ($f_3$),
   a second mixer means connected to said first and third oscillators for heterodyning said first ($f_1$) and said third ($f_3$) oscillator output signals,
   phase shifting means interposed between said first oscillator output and said second mixer means,
   means combining the outputs of said first and second mixer means and for feeding the resultant to said Hall device,
   means tuned to said frequency ($f_3$) connected to the output of said Hall effect device to demodulate the output signal therefrom, and means connected to said last named means for indicating the amplitude of said demodulated signal.

6. A measuring system as set forth in claim 1 further comprising a second Hall effect device in said magnetic field probe magnetically coupled to said magnetizing coil, means for also feeding said heterodyned signals to said second Hall effect device, means also connected to the output of said second Hall effect device tuned to said frequency ($f_2$), and means for differentially combining the outputs of said Hall effect devices at said frequency ($f_2$) prior to demodulation.

References Cited

UNITED STATES PATENTS 3,359,495  12/1967  McMaster et al. _____ 324—45

OTHER REFERENCES

Kemp, B.: The Hall-Effect Instrumentation; The Bobbs-Merrill Co., Inc., New York, January 1963, pp. 31–32.

RUDOLPH V. ROLINEC, Primary Examiner

R. J. CORCORAN, Assistant Examiner

U.S. Cl. X.R.

324—40